United States Patent [19]
Chern

[11] Patent Number: 5,585,946
[45] Date of Patent: Dec. 17, 1996

[54] VIRTUAL IMAGE DISPLAY SYSTEM WITH REDUCED AMBIENT REFLECTION AND LOW RADIATION

[75] Inventor: Mao-Jin Chern, Rancho Palos Verdes, Calif.

[73] Assignee: Vivitek Co., Ltd., Hsinchu, Taiwan

[21] Appl. No.: 293,641

[22] Filed: Aug. 19, 1994

[51] Int. Cl.$^6$ .......................... G02F 1/1335; G02B 27/14
[52] U.S. Cl. .................. 349/5; 359/631; 349/74
[58] Field of Search .................... 359/630, 631, 359/633, 634, 486, 40, 65, 73, 53

[56] References Cited

U.S. PATENT DOCUMENTS

| | | | |
|---|---|---|---|
| 3,443,858 | 5/1969 | Russa | 359/631 |
| 4,653,875 | 3/1987 | Hines | 359/631 |
| 5,050,966 | 9/1991 | Berman | 359/38 |
| 5,066,108 | 11/1991 | McDonald | 359/65 |
| 5,383,053 | 1/1995 | Hegg et al. | 359/486 |
| 5,387,920 | 2/1995 | Bos et al. | 359/62 |
| 5,408,346 | 5/1995 | Trissel et al. | 359/65 |

*Primary Examiner*—William L. Sikes
*Assistant Examiner*—Kenneth Parker
*Attorney, Agent, or Firm*—Bo-In Lin

[57] ABSTRACT

A virtual image display system with reduced ambient reflection. The virtual image display system includes a black and white image source for projecting a black and white image. The black and white image is then projected to a magnifying virtual image optical arrangement including a concave reflecting mirror. The magnifying virtual image optical arrangement and a color shutter including a linear polarizer receive the black and white image to generate a magnified color virtual image. The virtual color image display system further includes a λ/4-plate for cooperating with the color shutter including the linear polarizer to reduce an ambient reflection from the concave reflecting mirror.

10 Claims, 2 Drawing Sheets

VIRTUAL IMAGE DISPLAY SYSTEM WITH REDUCED AMBIENT REFLECTION AND LOW RADIATION

BACKGROUND OF THE INVENTION

1. Field of the Invention

This invention relates generally to the design and manufacture of a color display system. More particularly, this invention relates to an improved design and system configuration for a virtual image color display system incorporating a color shutter assembly and off-axis optical configuration wherein the ambient reflection is greatly reduced and a magnified image in color is provided without requiring large image source or high voltage power input such that the power consumption and radiation from a color display system can be substantially reduced.

2. Description of the Prior Art

Since large size color image displays with high intensity bright colors are highly desirable in modern color display systems, such systems are often limited by the concerns that high power input is required to produce high intensity bright images thus causing high power consumption and generating higher level of radiation. Even that better quality and more pleasant images are provided by larger and brighter color display systems, concerns of health hazards for close distance long term operation may limit the application. Additionally, the 'ghost image' caused by ambient reflection generated frequently from self-reflection may also interfere and adversely affect the visual performance of the display system. Even that high quality of optical performance can be achieved by display systems applying on-axis or near on-axis virtual image techniques, the undesirable effects caused by the ambient reflection with the ghost images continue to be conspicuous and visually annoying. As more color monitors and greater size television sets are being used, there are greater demands for overcoming these limitations whereby the benefits of larger, brighter and better quality image displays can be fully realized both at work place and in enjoying a wide variety of electronic entertainments.

In order to reduce the ambient reflection, one of a conventional techniques is by the a circular polarizer which reduces the reflection of the ambient light because the reverse of the handness of polarization in reflection. The reduction of ambient reflection is significant. But for a high quality color display system, particularly for the high performance system utilizing the on-axis or near on-axis virtual image techniques, the reduction is still not adequate.

Ziegler discloses in U.S. Pat. No. 4,657,348 entitled 'Arrangement to Remove Reflection from Liquid Crystal Displays (LCDs)' (issued on Apr. 14, 1987) an optical arrangement to remove reflection from LCD display by employing a cover disk in front of the LCD which is disposed obliquely to and apart from the LCD. A quarter wave retarding foil is disposed on the liquid crystal cell. The cover disk includes a polarizer. The quarter wave foil cooperates with the polarizer to substantially remove the reflection fro the light passing through the cover disk. Application of the polarizer together with the λ/4 plate to remove the ambient reflection is thus well known in the art. However, such technique imposes several limitations for modern display devices, particularly for the virtual image color display systems. First of all, for a virtual image display, the blocking of the ambient reflection by this conventional method also reduces the brightness of the image display. It is caused by the reduction of the image reflection by the polarizer and λ/4 retarding foil. Additionally, for a virtual display monitor employed with computers in a office setting, there are generally strong overhead lights projecting strong ambient light to the viewing window. The ambient reflection of these overhead lights interfering with the virtual display images and becomes are very annoying.

In another U.S. Pat. No 5,278,532, entitled 'Automotive Instrument virtual Image Display' issued on Jan. 11, 1994, Hegg et al. disclose a virtual image automotive instrument display system. Special shielding designs are used to prevent strong ambient reflection. Unlike automotive instrument display systems, a larger virtual image display system such as larger size televisions or computer monitors, the display images are more vulnerable to ambient reflection due to the larger size of the viewing windows and the projection of overhead lights onto the screens on the widows. The shield designs which may be effective for automotive instrument application are not adequate for modern larger size display apparatuses.

In the art of designing and manufacturing virtual image color display systems, a need still exists for a novel system configuration and design method to more effective remove the ambient reflection. Particularly, for a color display system such as a computer monitor, where an operator often sits many hours underneath strong overhead lights, there is an urgent need to provide a novel color display system which can provide bright color image display without high level of radiations while reducing the interferences from the ambient reflection and reflection from the strong overhead lights to a minimum amount.

SUMMARY OF THE PRESENT INVENTION

It is therefore an object of the present invention to provide an optical design technique with novel system configuration for a virtual image display system to overcome the aforementioned difficulties and limitations encountered in the prior art.

Specifically, it is an object of the present invention to provide a high quality virtual image display system with reduced ambient reflection without unduly reducing the brightness of the image display.

Another object of the present invention is to provide a high quality virtual image display system with reduced reflection of the overhead lighting.

Another object of the present invention is to provide a virtual image display system capable of displaying large-size color images at high level of brightness without requiring the use of high power and high radiation image sources.

Briefly, in a preferred embodiment, the present invention comprises a virtual image display system with reduced ambient reflection. The virtual image display system includes a monochromatic image source for projecting a monochromatic image. The monochromatic image is then projected to a magnifying virtual image optical arrangement including a concave reflecting mirror. The magnifying virtual image optical arrangement and a color shutter including a circular polarizer receive the monochromatic image to generate a magnified color virtual image. The virtual color image display system further includes a λ/4-plate for cooperating with the color shutter including the circular polarizer to reduce an ambient reflection from the concave reflecting mirror.

It is an advantage of the present invention that it provides a high quality virtual image display system with reduced ambient reflection without unduly reducing the brightness of the image display.

Another advantage of the present invention is that it provides a high quality virtual image display system with reduced reflection of the overhead lighting.

Another advantage of the present invention is that it provides a virtual image display system capable of displaying large-size color images at high level of brightness without requiring the use of high power and high radiation image sources.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
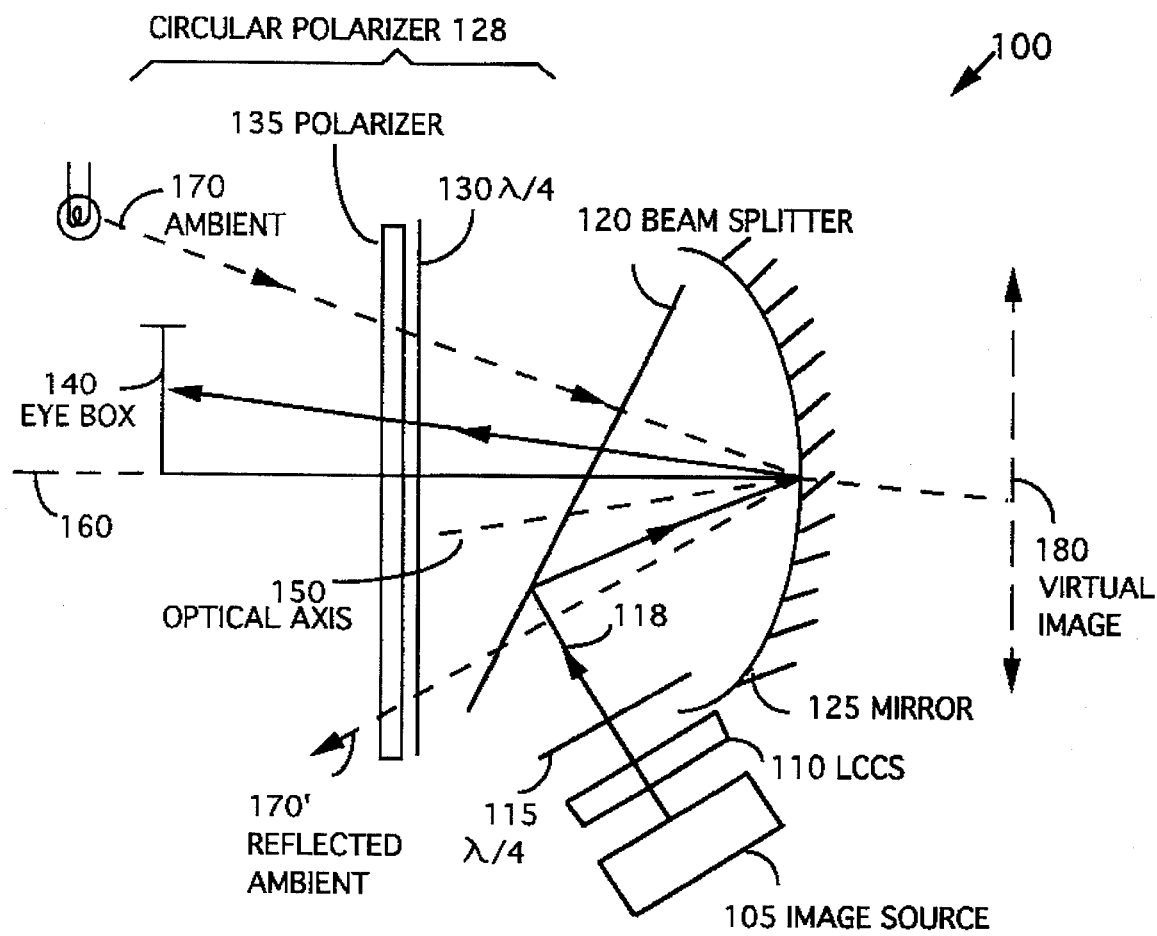
FIG. 1 is an optical system diagram showing a virtual image display system with reduced ambient reflection and low radiation according to the present invention.

FIG. 1 is a system diagram of a virtual image display system 100 of the present invention for displaying an image received from a black and white image source 105 which may be a cathode ray tube (CRT), a liquid crystal display LCD), a field emission device, a deformable mirror device or other types of electro-optical image devices. The black and white (B/W) images from the image source 105 are projected to a color shutter 110 to covert the images into color images. One example of color shutter is a liquid crystal color shutter (LCCS) as described in U.S. Pat. Nos. 4,631,051 or 4,582,396. Another example is a ferroelectric electro-optical shutter as described in another U.S. Patent. Both types of color shutters consists of electro-optical medium and polarizers. The image light transmitted through the shutter 110 is therefore a linearly polarized light. The linearly polarized light transmitted through the color shutter 110 passes through a $\lambda/4$ plate 115 for converting into a beam 118 with specific polarization. The polarized beam 118 is then reflected from a beam splitter 120 to project to a mirror 125 where it is reflected to pass through a circular polarizer 128 which includes a second $\lambda/4$ plate 130 and a linear polarizer 135 to reach an eye box 140. The beam splitter 120 and the mirror 125 are arranged in an off-axis manner such that the axis of reflection 150 for the processed image beam 118 is off axis and is about ten degree or less from the optical axis 160 of the mirror 125.

The light output from the image source 105 when passes through the polarizer of the liquid crystal color shutter (LCCS) 110 and the $\lambda/4$ plate 115, the light output becomes circularly polarized. As the circularly polarized beam 118 is reflected from the beam splitter 120 and the mirror 125, the handness of the polarization does not change. When the circular polarizer 128 is arranged to be in the same handness with the circularly polarized beam 118 reflected from the mirror 125, then the light beam will pass through the circular polarizer 128 without much attenuation. However, in entering the display system 100, the external ambient light 170 is circularly polarized in passing through the circular polarizer 128. As this ambient light 170 being reflected back from the mirror 125, the handness of polarization of the reflected ambient light 170' is changed. In exiting the display system 100, the reflected ambient light 170', is blocked by the circular polarizer 128. The ambient reflection, which often interferes with the magnified virtual image 180 displayed behind the mirror 125, is therefore greatly reduced.

Furthermore, since the reflecting mirror 125 is arranged slightly off axis, another source of interference coming from reflection of the overhead light is reduced. A strong ambient light which may often shine upon the display system 100 is form an overhead light which generally results in high intensity reflection back to a viewer's eyes when the optical path of the image reflection, i.e., the reflection of the circularly polarized beam 118, is arranged to be on-axis. By deliberately arranging the reflecting mirror 125 to be slightly off-axis with respect to the optical path of the image reflection, the ambient reflection of the overhead light is directed downward from the eye box 140 thus less likely to reach a viewer's eyes directly. In addition to the blocking effect of the circular polarizer 128 because of the handness of the polarization, the interference from the ambient reflection is further reduced with off-axis design.

Therefore, by incorporating the circular polarizer 128 in an off-axis configuration, the virtual image display system 100, is able to substantially reduce the ambient reflection and the reflection resulting from the overhead lights. A viewer is provided with a virtual image display system 100 which has much lower level of interferences than the conventional display systems. Meanwhile, an excellent image display with brightness suitable for high quality video system is achievable by the use of a low-radiation image source 105. This high level of image brightness for showing the images received from a low power and low radiation image source is achievable by the virtual image system 100 because the brightness of the image is not significantly attenuated by the circular polarizer 128 by utilizing the color shutter 110 with a $\lambda/4$ plate 115 in front of the black and white image source 105.

The present invention thus discloses a virtual image display system 100 with reduced ambient reflection. The virtual image display system 100 includes a monochromatic image source 105 for projecting a monochromatic image. The virtual image display system further includes a color shutter 110 for receiving the monochromatic image and converting the monochromatic image into a color image. The virtual image display system 100 further includes a first $\lambda/4$ plate 115 which cooperates with the color shutter 110 for circularly polarizing the color image. The virtual image display system 100 further includes a magnifying virtual image optical arrangement including a concave reflecting mirror 125 for receiving the color image for generating a magnified color virtual in, age. The virtual image display system further includes a circular polarizer 128 including a second $\lambda/4$-plate 130 for cooperating with the first $\lambda/4$ plate 115 and the color shutter 110 to allow the color image to pass through while reducing an ambient reflection from the concave reflecting mirror 125. In a preferred embodiment, the virtual image display system 100 further includes a viewing window 140 for an operator to view the magnified virtual color image. The circular polarizer 128 including the second $\lambda/4$ plate 130 are disposed on the back side of the view window 140. In another preferred embodiment, the color shutter 110 is a liquid crystal color shutter which further including liquid crystal cells and color polarizers. In yet another preferred embodiment of the virtual image display system 100, the color shutter is a ferroelectric color shutter which further including ferroelectric cells and color polarizers. In yet another preferred embodiment of the virtual image display system 100 the magnifying virtual image optical arrangement further includes a beam splitter 120 for reflecting the color image from the color shutter 110 and the first λ/4 plate 115 to the concave reflecting mirror 125 with a reflection axis which is an axis symmetrical to an incident and reflecting optical paths of the color image wherein the reflection axis deviates for an angle of ten degrees or less from an axis of the concave reflecting mirror.

Figure 2:
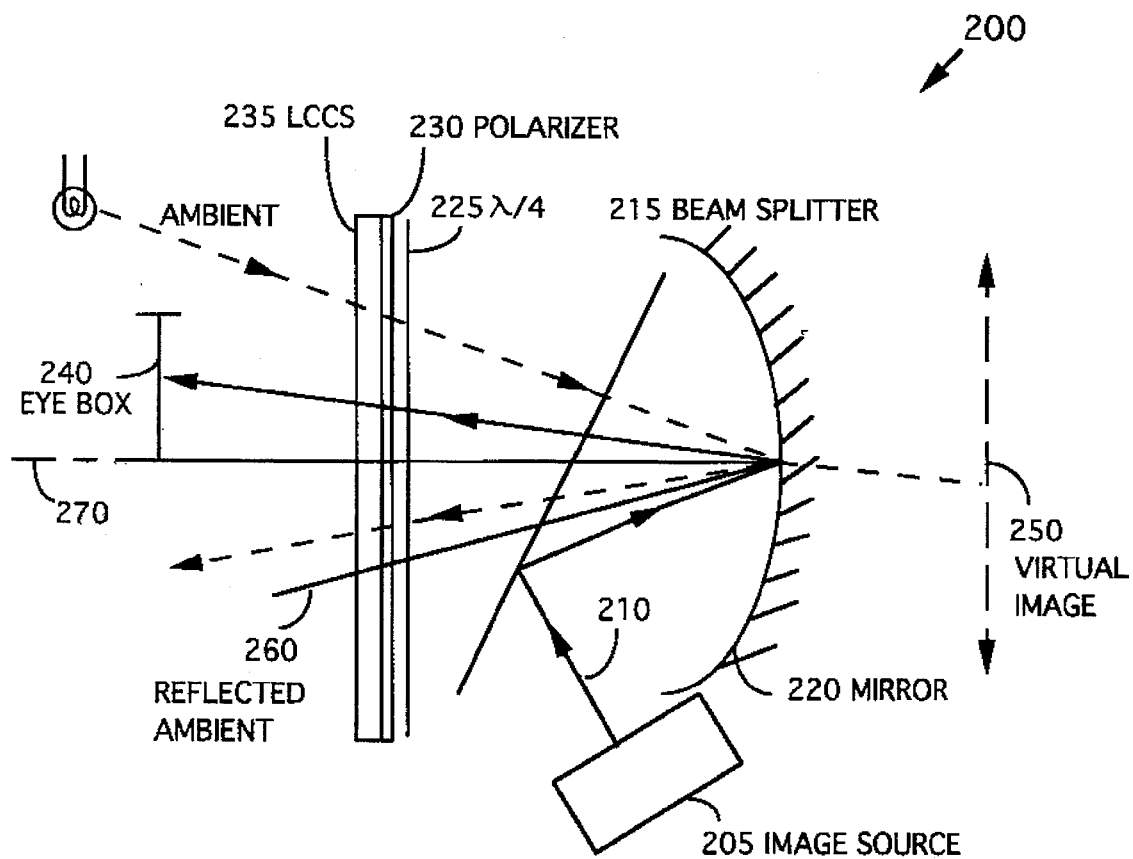
FIG. 2 is an optical system diagram showing another virtual image display system according to the present invention.

FIG. 2 shows an another preferred embodiment of the present invention for a virtual image display system 200 which is characterized by employing a novel optical configuration including a color shutter and a λ/4 plate advantageously arranged in a specific manner to provide even higher image brightness while further reducing the ambient reflection. The virtual image display system 200 receives images to be displayed from an image source 205. The images from the image source are black and white images. The black and white image source may be a cathode ray tube (CRT), a liquid crystal display LCD), a field emission device, a deformable mirror device or other types of electro-optical image devices. The images projected as an image beam 210 to a beam splitter 215 and reflected by the beam splitter 215 to a mirror 220 which reflects the image beam 210 to a window assembly. The window assembly includes a λ/4 plate 225, and a color shutter (LCCS) 235 which including a linear polarizer 230 facing the λ/4 plate 225. The color shutter 235 converts the image beam 210 into color images before it reaches the eye box 240. A viewer looking inside the eye box 240 will see a magnified virtual image 250 in color behind the mirror 220. For this display system 200, the intensity of an external ambient light 260 is reduced to approximately to six percent of its original intensity in passing through the color shutter when entering the system 200. The ambient light 260 is converted to a circularly polarized light by the λ/4 plate 225 and the linear polarizer 230 in the color shutter assembly 235. The handness of the polarization for the ambient light 260 is changed in reflecting back from the mirror 220 which is then blocked by the λ/4 wave plate 225 and the polarizer 230 in exiting the system 200. The exiting residual ambient reflection of this virtual image display system is further reduced because the attenuation factor of the color shutter 235 in the window assembly. Thus the total reduction in ambient reduction is achieved by the circular polarizer in the window assembly, which includes the λ/4 wave plate 225 and the linear polarizer 230, as well as by the absorptive nature of the color shutter assembly 235 in the window. Furthermore, the brightness of the color display is also improved because the system employs only one polarizer 230 compared to two polarizers used in the system 100. Similar to the design of FIG. 1, the beam splitter 215 and the mirror 220 are arranged such that the optical axis of the image reflection for the image beam 250 is slightly off-axis from the axis 270 of the mirror 220. The viewer is less likely to be interfered with the reflection of the overhead light since the reflection of these lights is directed to be few degrees downward from the image reflection.

The present invention thus discloses a virtual image display system 200 with reduced ambient reflection. The virtual image display system includes a monochromatic image source 205 for projecting a monochromatic image. The monochromatic image is received by a magnifying virtual image optical arrangement which includes a concave reflecting mirror 220 to project the image to a λ/4 plate 225 and a color shutter 230 including a linear polarizer 230. The magnifying virtual image optical arrangement and the color shutter 235 receiving the monochromatic image for generating a magnified color virtual image. The λ/4-plate 225 cooperates with the color shutter 235 including the linear polarizer 230 to reduce an ambient reflection from the concave reflecting mirror 220. In a preferred embodiment of the virtual image display system 200, it further includes a viewing window 240 for an operator to view the magnified virtual color image. The λ/4 plate 225 and the color shutter 235 are disposed on the back side of the view window 240. In another preferred embodiment of the virtual image display system 200, the color shutter 230 is a liquid crystal color shutter which further including liquid crystal cells and color polarizers. In yet another preferred embodiment, the virtual image display system 200, the color shutter is a ferroelectric color shutter which further includes ferroelectric cells and color polarizers. In yet another preferred embodiment of the virtual image display system 200, the magnifying virtual image optical arrangement further includes a beam splitter 215 for reflecting the monochromatic image from the image source 205 to the concave reflecting mirror with a reflection axis which is an axis symmetrical to an incident and reflecting optical paths of the monochromatic image wherein the reflection axis deviates for an angle of ten degrees or less from an axis of the concave reflecting mirror 220.

The mirror 125 in the system 100 or the mirror 220 in the system 200 can be configured to be either spherical or aspherical. An aspherical design can be employed to improve some of the optical performances such as disparity or the distortion of the system.

The display systems as disclosed in the present invention has the advantages that same level of brightness and size of image display can be provided by the use of low radiation and low power image sources. such advantages can be achieved because the image sources, i.e., image sources 105 and 205, can be a small monochromatic image source which is then converted into color images by the use of color shutters. The smaller color images are then magnified to a larger display images through the application of the beam splitter and the mirror. The small monochromatic image source requires low anode voltage and power in operation and resulting in lower level of radiations. The system configuration thus provides a monitor for virtual display terminal which is safer to operate with its lower voltage requirements and causes less potential environmental and health hazards because the lower level of radiation during operation. Such systems may be most desirable for use as a desk top computer monitor or as a multi-media monitor which is likely to be operated for long hours. Particularly, the lower level of radiation may be a most desirable feature when electronic or TV games are to be played which may involve minors intensely viewing the display screen at close distance for long hours. Precaution to prevent health hazards due to radiation at close distance and safety concerns with high power operation may be resolved by a system according to the present invention.

The present invention thus provides an optical design technique with novel system configuration for a virtual image display system to overcome the difficulties and limitations encountered in the prior art. A high quality virtual image display system with reduced ambient reflection without unduly reducing the brightness of the image display is disclosed by the present invention. The reflection of the overhead lighting is also reduced with off-axis optical design. Furthermore, by the use of the virtual image display system disclosed in this invention, large-size color images at high level of brightness can be displayed without requiring the use of high power and high radiation image sources.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A virtual image display system with reduced ambient reflection comprising:

a black and white image source for projecting a black and white image therefrom;

a magnifying virtual image optical arrangement including a concave reflecting mirror for receiving and reflecting said black and white image projected from said image source assembly;

a λ/4-plate for receiving said black and white image reflected from said concave reflecting mirror;

a color shutter including a linear polarizer facing said λ/4-plate for receiving said black and white image for generating a magnified color virtual image displayed behind said concave reflecting mirror; and said polarizer and said λ/4-plate converting an external ambient beam into a circularly polarized beam of a first polarization, said external ambient beam when reflected from said concave reflecting mirror is converted to a reflecting ambient beam which is a circularly polarized beam of a second polarization whereby said reflecting ambient beam is blocked by said λ/4-plate and said color shutter thus reducing an ambient reflection.

2. The virtual image display system of claim 1 further comprises:

a viewing window, disposed outside of said color shutter opposite said λ/4 plate and said reflecting mirror, for an operator to view said magnified virtual color image behind said concave reflecting mirror.

3. The virtual image display system of claim 2 wherein:

said color shutter is a liquid crystal color shutter which further including liquid crystal cells and color polarizers disposed adjacent to each other for transmitting an optical beam therethrough wherein each of said liquid crystal cells is controlled to have an on or off state thus generating, in combination with said color polarizers, a color display beam from said optical beam transmitting therethrough.

4. The virtual image display system of claim 2 wherein:

said color shutter is a ferroelectric color shutter which further including ferroelectric cells and color polarizers disposed adjacent to each other for transmitting an optical beam therethrough wherein each of said ferroelectric cells is controlled to have an on or off state thus generating, in combination with said color polarizers, a color display beam from said optical beam transmitting therethrough.

5. The virtual image display system of claim 2 wherein:

said magnifying virtual image optical arrangement further includes a beam splitter for reflecting said black and white image from said image source to said concave reflecting mirror with a reflection axis which is an axis symmetrical to an incident and reflecting optical paths of said monochromatic image wherein said reflection axis deviates for an angle of ten degrees or less from an axis of said concave reflecting mirror.

6. A virtual image display system with reduced ambient reflection comprising:

a black and white image source for projecting a black and white image;

a color shutter for receiving said monochromatic image and converting said monochromatic image into a color image;

a first λ/4 plate cooperating with said color shutter for circularly polarizing said color image;

a magnifying virtual image optical arrangement including a concave reflecting mirror for receiving said color image for generating a magnified color virtual image; and a circular polarizer including a second λ/4-plate for cooperating with said first λ/4 plate and said color shutter to allow said color image to pass through while reducing an ambient reflection from said concave reflecting mirror.

7. The virtual image display system of claim 6 further comprises:

a viewing window for an operator to view said magnified virtual color image; and said circular polarizer including said second λ/4 plate are disposed on the back side of said view window.

8. The virtual image display system of claim 7 wherein:

said color shutter is a liquid crystal color shutter which further including liquid crystal cells and color polarizers disposed adjacent to each other for transmitting an optical beam therethrough wherein each of said liquid crystal cells is controlled to have an on or off state thus generating, in combination with said color polarizers, a color display beam from said optical beam transmitting therethrough.

9. The virtual image display system of claim 7 wherein:

said color shutter is a ferroelectric color shutter which further including ferroelectric cells and color polarizers disposed adjacent to each other for transmitting an optical beam therethrough wherein each of said ferroelectric cells is controlled to have an on or off state thus generating, in combination with said color polarizers, a color display beam from said optical beam transmitting therethrough.

10. The virtual image display system of claim 7 wherein:

said magnifying virtual image optical arrangement further includes a beam splitter for reflecting said color image from said color shutter and said first λ/4 plate to said concave reflecting mirror with a reflection axis which is an axis symmetrical to an incident and reflecting optical paths of said color image wherein said reflection axis deviates for an angle of ten degrees or less from an axis of said concave reflecting mirror.

\* \* \* \* \*